UNITED STATES PATENT OFFICE.

THOMAS ADAMS, OF BROOKLYN, N. Y., ASSIGNOR TO JOHN D. ADAMS.

CHEWING-GUM.

SPECIFICATION forming part of Reissued Letters Patent No. 9,152, dated April 13, 1880.

Original No. 111,798, dated February 14, 1871. Application for reissue filed February 26, 1880.

*To all whom it may concern:*

Be it known that I, THOMAS ADAMS, of the city of Brooklyn, in the county of Kings and State of New York, have invented a new and useful Improvement in Chewing-Gum; and I do hereby declare that the following is a full, clear, and exact description thereof.

I have discovered that the substance known as "gum chicle," and hereinafter more particularly described, has, when properly washed or clarified, qualities which render it peculiarly adapted for use as a chewing-gum; and in order that others may understand and practice said discovery, I will proceed to describe the manner of adapting the material for the purpose specified, and subsequently to define in the claim what I desire to secure by Letters Patent.

The substance referred to as chicle or sapota is a vegetable gum or resin, the product of a tree belonging in botany to the family *Sapotaceæ*, which grows in Mexico.

The crude material varies from a dark cream to a brownish or earthy color, and is found to contain the following constituents: chicle gum or resin, seventy-five per cent.; oxalate of lime, (with small quantities of sulphate and phosphate,) nine per cent.; arabin, about ten per cent.; sugar, about five per cent.; salts, soluble in water, (chloride and sulphate of magnesia, small quantities of potash salts,) five-tenths of one per cent.

The chicle gum or resin contains alban, forty-five per cent.; fluavil, thirty per cent.; insoluble hydrocarbon, seventeen per cent.; and soluble hydrocarbon, eight per cent.

The above figures are, of course, only approximate; but from them it is evident that chicle is merely the product of direct evaporation of the juice without attempt of separation, and that in the gum or resin but little of the original hydrocarbon has escaped oxidation, and the difference in the properties of the gum or resin from the properties of the original hydrocarbon is readily comprehensible.

In preparing the crude material for the purpose set forth, I first subject it to one or more hot-water baths, which softens and melts the same, and after boiling for some time, milky, chocolate-colored liquids are obtained, which contain the arabin, saccharine matter, and soluble salts in solution, and the oxalate of lime in fine suspension. The water containing the foreign matter in solution and suspension is then removed and the plastic or melted gum rolled or poured into sheets or strips of convenient size, and then cut into pieces of the required shape for use.

The prepared gum is light and compressible, free from odor or taste, and when subjected to the warmth of the mouth becomes very tenacious and ductile, and can be stretched, molded into form, or broken and instantly reunited. It is practically free from deleterious properties, contains nothing of an unwholesome character, and is not dissolved by the saliva of the mouth.

Previous to my invention chewing-gums have been made and used of various and more costly substances, not always free from deleterious properties, and devoid of the qualities enumerated and contained in my invention. Therefore,

What I claim, and desire to secure by Letters Patent, is—

A chewing-gum composed of washed or clarified chicle, as an improved article of manufacture.

THOMAS ADAMS.

Witnesses:
JULES HALBRAN,
CHAS. W. FORBES.